Sept. 5, 1933.   A. H. KING ET AL   1,925,987
INTERNAL COMBUSTION ENGINE
Original Filed June 5, 1928
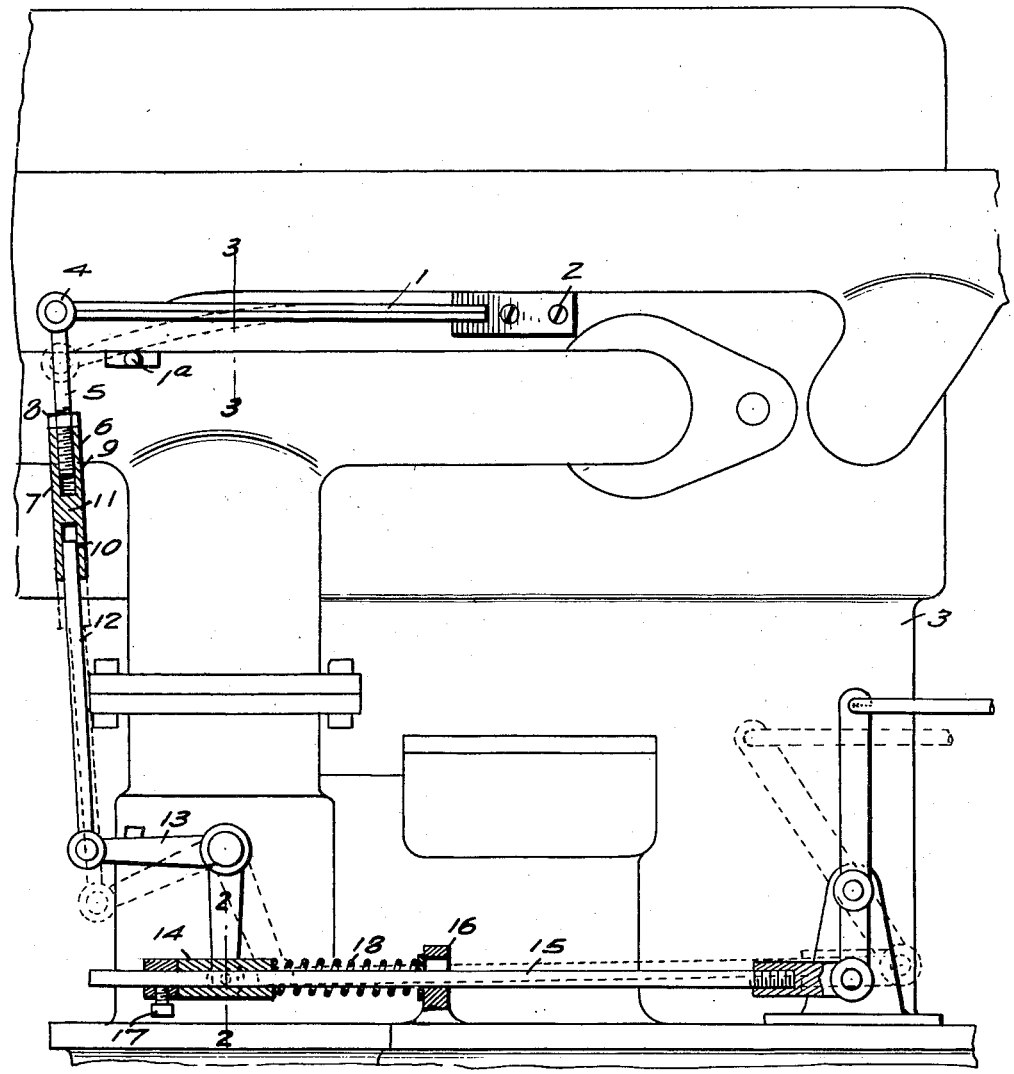
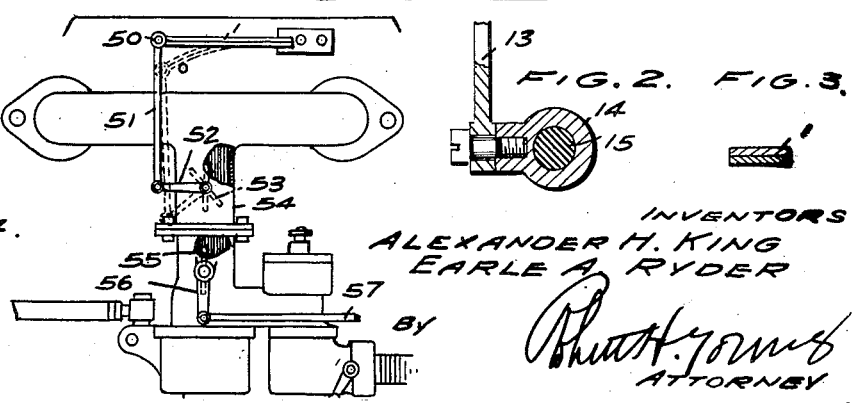
INVENTORS
ALEXANDER H. KING
EARLE A. RYDER
BY
ATTORNEY

Patented Sept. 5, 1933

1,925,987

UNITED STATES PATENT OFFICE 1,925,987

INTERNAL COMBUSTION ENGINE

Alexander H. King and Earle A. Ryder, West Hartford, Conn., assignors to The Pratt & Whitney Aircraft Company, Hartford, Conn.

Original application June 5, 1928, Serial No. 283,081, now Patent No. 1,838,408, dated December 29, 1931. Divided and this application August 31, 1929. Serial No. 389,782

27 Claims. (Cl. 123—198)

This invention relates in general to internal combustion engines and is more particularly concerned with thermostatic controls governing the operation of the same between certain ranges of combustion cylinder temperatures. This invention is a division from our Patent No. 1,838,408 Dec. 29, 1931, and is especially directed to such thermostatic devices as applicable to engine throttle control.

Internal combustion engines have a tendency to overheat under conditions of excess load, incorrect carburetion due to the use of low grade fuels or improper adjustment of fuel proportions, incorrect spark timing and other adverse conditions. Such conditions frequently cause detonation, which in turn causes further overheating, poor lubrication, loss in horsepower output and the final seizing of the pistons within their cylinders and the destruction of the engine.

It is well recognized that failure of an engine due to overheating is due to excessive temperature of the cylinder head or cylinder walls, and this excessive temperature may be caused either by high combustion temperature, deficiency of the cooling system, or a condition such as detonation, which causes a disproportionate part of the heat of combustion to be transferred to the cylinder walls.

The prior art contains efforts to regulate engine temperatures by control of the cooling means, as, for example, thermostatic control of the cooling water circulation. Such means are effective to maintain a certain minimum temperature which may be desirable for operation, but are powerless to limit the maximum temperature of the combustion chamber or cylinder whenever the conditions of operation cause the evolution and transfer to the cylinder walls of more heat than the cooling system is capable of absorbing.

In order to remove the danger which might otherwise arise from excess loads, poor fuel selection, improper spark timing, deficiency of the cooling system or other causes of overheating, it is the purpose of this invention to provide a means, governed by cylinder temperature, for controlling the amount of heat supplied to the cylinder walls. In general any control is effective which operates to reduce the pressure and/or temperature of combustion; or to prevent detonation if conditions likely to cause detonation are present.

Combustion temperature may be lowered, and detonation, if any, reduced by partially closing the throttle, retarding the spark, enriching the fuel mixture, or by various combinations of movements of the three controls. It is, therefore, an object of this invention to provide a means, governed by combustion cylinder temperature, for controlling, within certain bounds the setting of the engine throttle control.

It is the prime object of this invention to position a thermostat at a point vitally affected by overheating, such as on, or adjacent to, the barrel or head of one of the engine cylinders, and to connect the same by suitable means to the engine throttle control in such a manner that excessive cylinder temperatures will result in a partial closing of the engine throttle control to the end that destructive temperatures will be avoided.

It is another object of this invention to provide, in the connections between the thermostatic device and the engine throttle control, a certain degree of lost motion to prevent the thermostat from becoming effective until a predetermined combustion cylinder temperature has been reached.

It is a further object of this invention to provide for adjustment of these connecting means to permit of a variable setting to vary the point at which the thermostat becomes effective upon the throttle.

Other objects of our invention will appear in the accompanying specification and claims and will be disclosed in the accompanying drawing in which—

Figure 1 is a side elevation, shown partly in section, of our device as applied to an internal combustion engine;

Figure 2 is a section on the line 2—2 of Figure 1;

Figure 3 is a section on the line 3—3 of Figure 1;

Figure 4 is a showing, in side elevation, and with portions broken away, showing a modification of our device.

Referring now with greater particularity to the drawing it will be seen that our device is comprised as follows:

A thermostat 1, preferably, though not necessarily, comprise of two dissimilar metals having different coefficients of expansion and welded or riveted together, is secured by any suitable means such as is illustrated at 2, to the cylinder 3 of the engine at a point at, or adjacent to, the head of the said cylinder. At its free end the thermostat is connected to a fitting 4 pivotally connected to a control rod 5. The lower end 6 of the rod 5 screw-threadedly engages in and with the upper bore 9 of a gland 7, being adjustably positionable therein, and being provided with a nut 8 for locking the same in any position to which it has been adjusted.

A lower and smooth bore 10 in the gland 7 is spaced from the bore 9 by the material at 11 and is adapted to receive, slidably, the control rod 12. The control rod 12, at its lower end, is pivotally connected to one end of a bell crank lever 13, the other end of which is pivotally connected to a permissive link 14 yieldably connected to the throttle rod 15. The bell crank lever 13 controls the setting of the throttle valve of the carburetor. The permissive link 14 is adjustably mounted on main throttle control rod 15 by means of stops 16 and 17, being slidable on the rod 15 and being urged toward the stop 17 by means of a compression spring 18.

The gland 7 is adjusted to such a position that the upper end of the rod 12 fails to reach the upper end of the bore 10 when the engine is cold. The amount of the gap left is dependent upon the temperature range designed to be permitted before the thermostat, moving to such a position as is shown in dotted lines in Figure 1, will cause the upper end of the rod 12 to contact with the upper end of the bore 10 so that further downward movement of the free end of the thermostat will result in partial closing of the throttle. A stop 1a is provided to limit the active range of the thermostat 1, so as to prevent excess closing action on the throttle as emergencies may require that the full power be had momentarily even at the expense of temporary overheating.

In the modification shown in Figure 4 we have illustrated a thermostat 1, as pivotally connected at 50 to a rod 51 which is in turn pivotally connected to a lever 52 for operating a supplemental throttle 53 located above the normal engine throttle. The advantage of this structure over the other structure shown is that the throttling of the engine will take place without disturbing the setting of the hand control. The advantage of this is apparent as the throttling takes place independently of the pilot's action and he cannot mistake the retarding of his hand throttle control resulting in the other showing as being due to a "creeping" throttle.

From the foregoing it will be seen that our device operates as follows:

As the temperature of the engine increases, the thermostat 1 gradually moves into the position indicated in dotted lines gradually depressing the gland 11. After the gland has been depressed to such a degree that the rod 12 reaches the upper limit of the bore 10, any further depressing movement of the thermostat results in a partial closing of the engine throttle valve against the action of spring 18 with the result that the temperature of the combustion chamber, and the effective combustion pressure therein, will be lowered.

Having thus described our invention what we claim is—

1. In combination, with an internal combustion engine and an operating control therefor, a thermostat, and means operatively connecting said thermostat to said control to move said control in such a manner as to reduce the effective combustion pressure within the cylinders of said engine when the temperature of said engine reaches a predetermined degree, a hand operated control means, and a yieldable connection between said first-named means and said hand control.

2. In combination, with an internal combustion engine and an operating control therefor, a thermostat, and means operatively connecting said thermostat to said control to move said control in such a manner as to reduce the effective combustion pressure within the cylinders of said engine when the temperature of said engine reaches a predetermined degree, a hand-operated control means, and a permissive linkage between said first-named means and said hand control.

3. In combination, with an internal combustion engine and an operating control therefor, a thermostat, and means operatively connecting said thermostat to said control to move said control in such a manner as to reduce the effective combustion pressure within the cylinders of said engine when the temperature of said engine reaches a predetermined degree, a hand-operated control means, and a permissive linkage including a resilient element between said first-named means and said hand control.

4. In combination, with an internal combustion engine and an operating control therefor, a thermostat, and means operatively connecting said thermostat to said control to move said control in such a manner as to reduce the effective combustion pressure within the cylinders of said engine when the temperature of said engine reaches a predetermined degree, said means being formed to permit of normal temperature increases without affecting said engine controls, a hand-operated control means, and a yieldable connection between said first-named means and said hand control.

5. In combination, with an internal combustion engine and an operating control therefor, a thermostat, and means operatively connecting said thermostat to said control to move said control in such a manner as to reduce the effective combustion pressure within the cylinders of said engine when the temperature of said engine reaches a predetermined degree, said means being formed to permit of normal temperature increases without affecting said engine controls, an element in said first-named means providing for adjustment thereof to vary the point at which its movement becomes effective upon said control, a hand-operated control means, and a yieldable connection between said first-named means and said hand control.

6. In combination, with an internal combustion engine having an engine operating throttle control, a thermostat mounted on said engine and in thermal communication therewith, and means operatively connecting said thermostat and said throttle control to exercise a positive closing movement on the latter when the temperature of said engine reaches a predetermined degree.

7. In combination, with an internal combustion engine having an engine operating throttle control, a thermostat mounted on said engine and in thermal communication therewith, and means operatively connecting said thermostat and said throttle control to exercise a closing movement on the latter when the temperature of said engine reaches a predetermined degree, and means for adjusting said connecting means to vary the point at which said thermostat becomes effective upon said throttle control.

8. In combination, with an internal combustion engine having an engine operating throttle control, a thermostat mounted on said engine and in thermal communication therewith, and means operatively connecting said thermostat and said throttle control to exercise a closing movement on the latter when the temperature of said engine reaches a predetermined degree, a hand-operated engine throttle control, and a permissive linkage between said first-named means and said hand control.

9. In combination, with an internal combustion engine having an engine operating throttle control, a thermostat mounted on said engine and in thermal communication therewith, and means operatively connecting said thermostat and said throttle control to exercise a closing movement on the latter when the temperature of said engine reaches a predetermined degree, and means for adjusting said connecting means to vary the point at which said thermostat becomes effective upon said throttle control, a hand-operated engine throttle control, and a permissive linkage between said first-named means and said hand control.

10. In combination, with an internal combustion engine having an engine operating throttle control, a thermostat mounted on said engine and in thermal communication therewith, a rod operatively connecting said thermostat and said throttle control to exercise a closing movement on the latter when the temperature of said engine exceeds a predetermined point, a hand-operated engine throttle control, and a permissive linkage between said first-named means and said hand control.

11. In combination, with an internal combustion engine having an engine operating throttle control, a thermostat mounted on said engine and in thermal communication therewith, a rod operatively connecting said thermostat and said throttle control to exercise a closing movement on the latter when the temperature of said engine exceeds a predetermined point, and means for adjusting the effective length of said rod, a hand operated engine throttle control, and a permissive linkage between said first-named means and said hand control.

12. In combination, with an internal combustion engine having an engine operating throttle control, a thermostat mounted on said engine and in thermal communication therewith, a rod operatively connecting said thermostat and said throttle control to exercise a closing movement on the latter when the temperature of said engine exceeds a predetermined point, and means for adjusting the effective length of said rod, a hand operated engine throttle control, and a permissive linkage, including a resilient member, between said first-named means and said hand control.

13. In combination, with an internal combustion engine having an engine operating throttle control, a thermostat mounted on said engine and in thermal communication therewith, and means operatively connecting said thermostat and said throttle control to exercise a closing movement on the latter when the temperature of said engine reaches a predetermined degree, and resilient means opposing said closing action.

14. In combination, with an internal combustion engine having an engine operating throttle control, a thermostat mounted on said engine and in thermal communication therewith, and means operatively connecting said thermostat and said throttle control to exercise a closing movement on the latter when the temperature of said engine reaches a predetermined degree, and means for adjusting said connecting means to vary the point at which said thermostat becomes effective upon said throttle control, and resiliently yieldable means opposing the movement of said thermostat under temperature increases.

15. In combination, with an internal combustion engine having an engine operating throttle control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree.

16. In combination, with an internal combustion engine having an engine operating throttle control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, and resilient means tending to oppose said closing movement.

17. In combination, with an internal combustion engine having an engine operating throttle control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, and means for adjusting said connecting means to vary the temperature point at which said thermostat becomes effective.

18. In combination, with an internal combustion engine having an engine operating throttle control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, resilient means tending to oppose said closing movement, and means for adjusting said connecting means to vary the temperature point at which said thermostat becomes effective.

19. In combination, with an internal combustion engine having an engine operating control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, a hand operated mechanism for operating said engine throttle, and a permissive linkage between said hand throttle operating mechanism and said connecting means.

20. In combination, with an internal combustion engine having an engine operating control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, resilient means tending to oppose said closing movement, means for adjusting said connecting means to vary the temperature point at which said thermostat becomes effective, a hand operated mechanism for operating said engine throttle, and a permissive linkage between said hand throttle operating mechanism and said connecting means.

21. In combination, with an internal combustion engine having an engine operating control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, means for adjusting said connecting means to vary the temperature point at which said thermostat becomes effective, a hand operated mechanism for operating said engine throttle, and a permissive linkage between said hand throttle operating mechanism and said connecting means.

22. In combination, with an internal combustion engine having an engine operating control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, resilient means tending to oppose said closing movement, and means for adjusting said connecting means to vary the temperature point at which said thermostat becomes effective, a hand operated mechanism for operating said engine throttle, and a permissive linkage between said hand throttle operating mechanism and said connecting means.

23. In combination, with an internal combustion engine having an engine throttle control, a thermostat in thermal communication with said engine, and means operatively connecting said thermostat and said throttle control to exercise a closing movement on the latter when the temperature of said engine reaches a predetermined degree, said thermostat being ineffective to operate said throttle during normal operating temperature range of said engine.

24. In combination, with an internal combustion engine having a throttle control, a thermostat responsive to engine temperature changes, and means operatively connecting said thermostat and said throttle control, said means being adapted to operate said throttle control only when the temperature of said engine exceeds a predetermined normal operating temperature.

25. A method of operating an internal combustion engine which comprises manually controlling the engine throttle when the engine is at or below normal operating temperatures, and automatically decreasing and increasing the throttle opening as the engine temperature increases and decreases above the normal operating temperature.

26. In combination, with an internal combustion engine and an operating control therefor, a thermostat, and means operatively connecting said thermostat to said control to move said control in such a manner as to reduce the effective combustion pressure within the cylinders of said engine when the temperature of said engine reaches a predetermined degree, a hand-operated control means, and means interposed between the hand operated means and the thermostat whereby the throttle may be operated by said hand operated means independently of said thermostat.

27. In combination, with an internal combustion engine having an engine operating control, a thermostat mounted on said engine and responsive to engine temperature changes, connecting means operatively connecting said thermostat to said throttle control to actuate the latter, said connecting means permitting all normal temperature increases without actuating said throttle but operating to enforce a closing movement on the same when the engine temperature exceeds a predetermined degree, a hand operated mechanism for operating said engine throttle, and means interposed between the hand operated means and the thermostat whereby the throttle may be operated by said hand operated means independently of said thermostat.

EARLE A. RYDER.
ALEXANDER H. KING.